(No Model.)
C. SHLEACOW.
FLY TRAP.
No. 527,221. Patented Oct. 9, 1894.
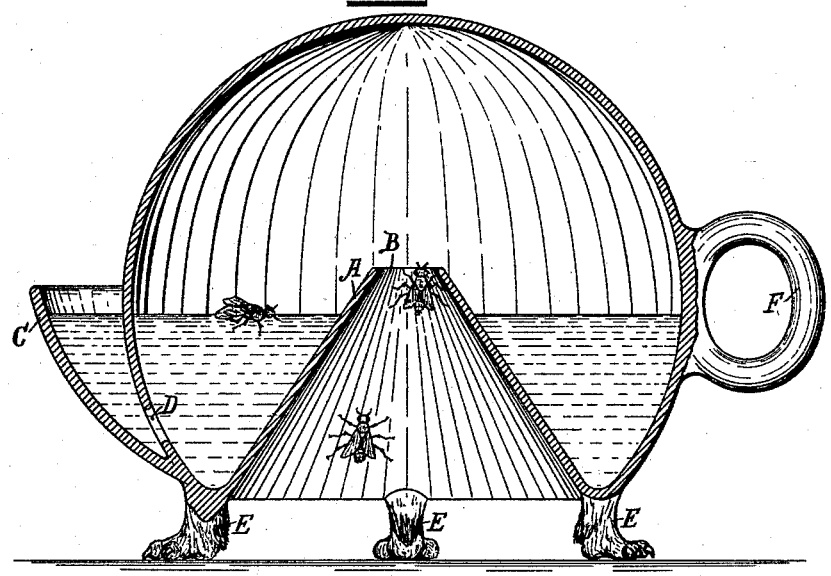
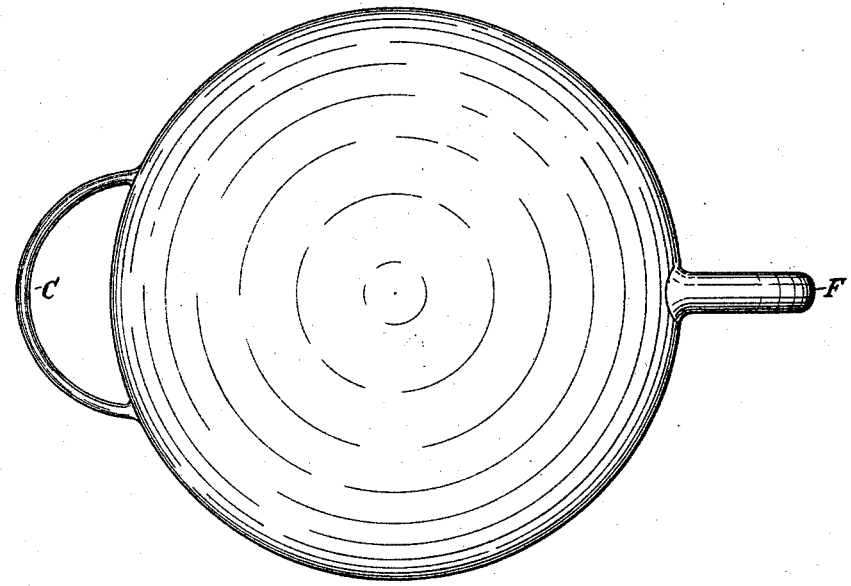
Witnesses:
Emil Reichelt.
Fred May.
Inventor
Charles Shleacow
by Reichelt & Oltsch,
Atty's

UNITED STATES PATENT OFFICE.

CHARLES SHLEACOW, OF LETHBRIDGE, CANADA.

FLY-TRAP.

SPECIFICATION forming part of Letters Patent No. 527,221, dated October 9, 1894.

Application filed January 12, 1894. Serial No. 496,667. (No model.) Patented in Canada January 13, 1892, No. 41,561.

*To all whom it may concern:*

Be it known that I, CHARLES SHLEACOW, a citizen of Canada, and a resident of Lethbridge, in the Province of Alberta, Canada, have invented certain new and useful Improvements in Fly-Traps, (for which I have obtained a patent in Canada, No. 41,561, bearing date January 13, 1892,) of which the following is a specification.

Reference is had to the accompanying drawings, in which—

Figure 1, represents a vertical cross-section of a fly-trap embodying my invention, and Fig. 2, represents a top view of the same.

This fly-trap is constructed of glass, porcelain or other suitable material, and consists of a vessel, preferably of globular form, the bottom part of which forms a cone A, which extends upward into the interior of the vessel and terminates in an opening B. A lip or spout C is attached to the outer side of the vessel and communicates with the receptacle formed by the outer sides of the vessel and the conical opening before mentioned, by an aperture D, near the base of the trap. Three or more small feet E E raise the trap a short distance above the table or other surface upon which it rests. A handle F may also conveniently be attached to the trap.

The fly-trap thus constructed is a novel, useful and convenient article, in one piece without any detachable parts.

In use the trap is placed upon any suitable surface, upon which it is desirable to place a little sugar or other substance to attract the flies. Water or some liquid poisonous to flies is poured into the spout of the vessel until it rises in the interior to within a short distance of the opening B, the surface of the liquid within the trap thus being above the level of the aperture D. The flies attracted by the sugar beneath the trap soon fly upward and into the trap through the opening B and after beating for a time upon the sides of the interior fall into the liquid beneath and soon die.

I am aware that fly-traps have heretofore been constructed of glass or partly of glass with an opening from beneath and designed to hold a liquid in the lower part, but

What I claim as my invention, and desire to secure by Letters Patent, is—

A fly trap consisting of a globular shaped vessel, the bottom part of which extends upward into the interior of the same and terminates in an opening B, the same being provided with a lip or spout C on the side thereof and beginning at the bottom of the side wall, said lip or spout having communication with the receptacle by means of the aperture D at the lower intersection of the spout and wall of vessel, substantially as shown and described.

In testimony that I claim the foregoing as my invention I have signed my name in presence of two subscribing witnesses.

CHARLES SHLEACOW.

Witnesses:
P. H. BELCHER,
JAS. W. DAVIS.